United States Patent Office 2,958,561
Patented Nov. 1, 1960

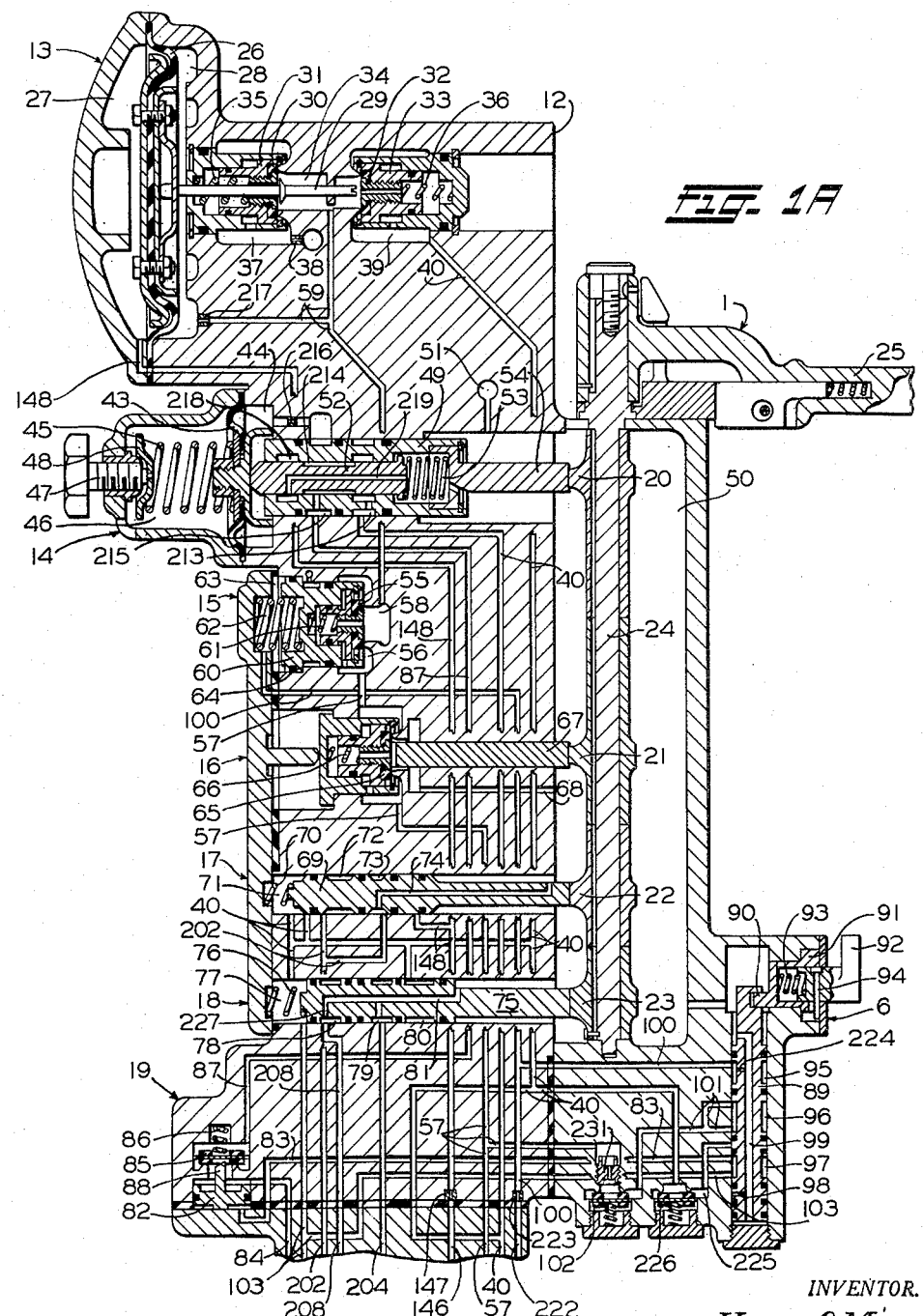

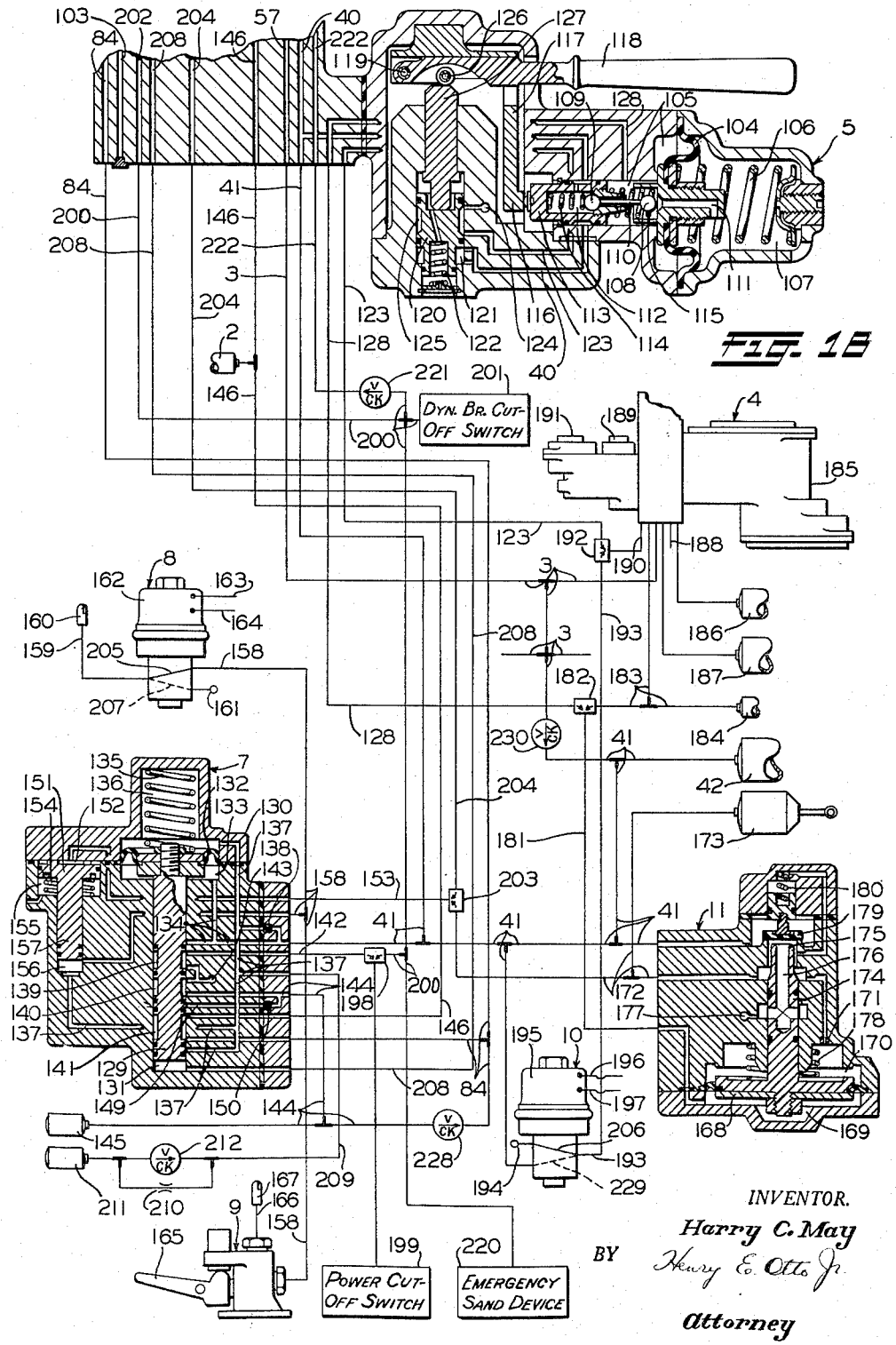

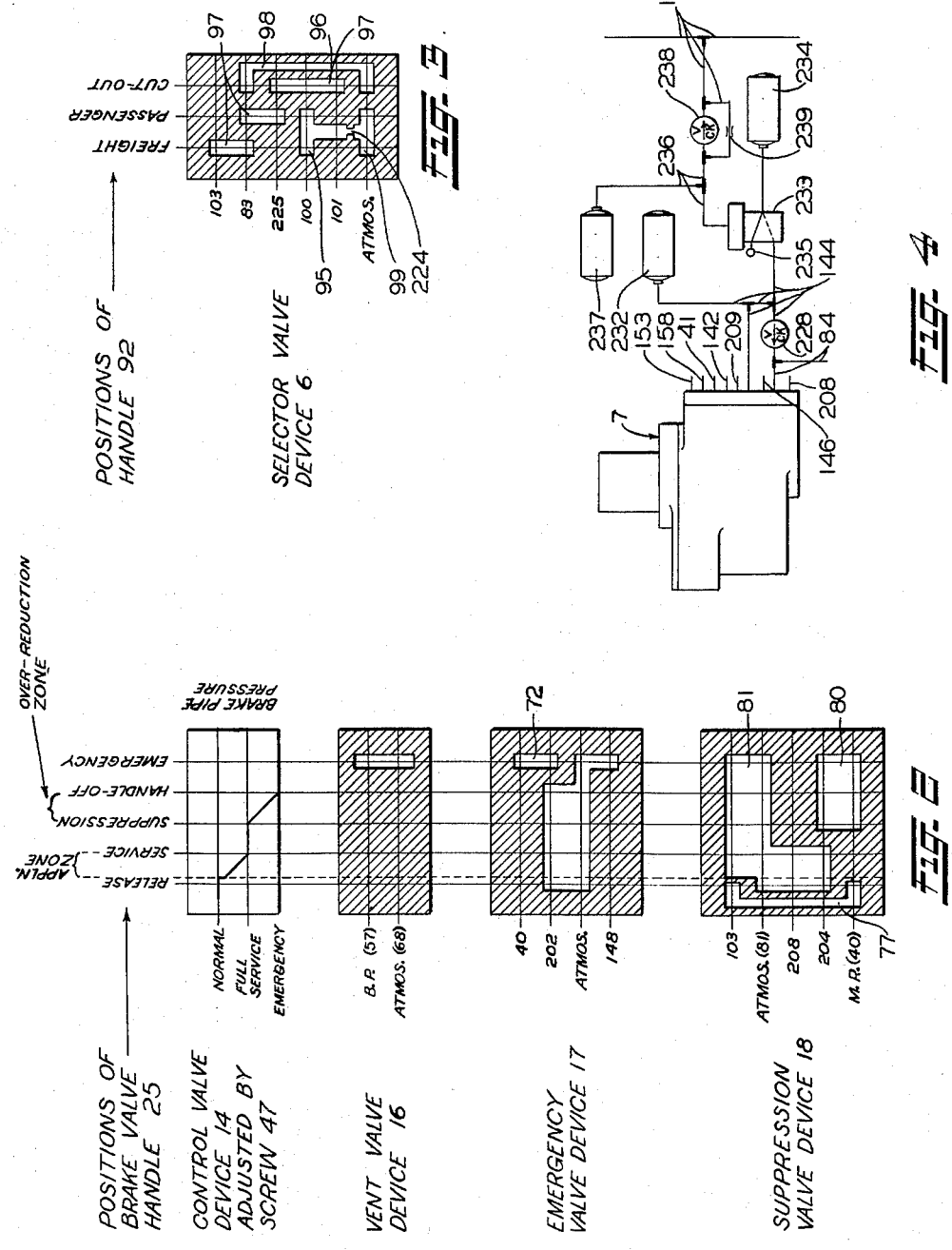

2,958,561

FLUID PRESSURE BRAKE APPARATUS

Harry C. May, East McKeesport, Pa., assignor to Westinghouse Air Brake Company, Wilmerding, Pa., a corporation of Pennsylvania Filed Sept. 30, 1958, Ser. No. 764,296

17 Claims. (Cl. 303—8)

This invention relates to fluid pressure brake apparatus for railway vehicles and more particularly to an improved apparatus of the above type variously conditionable for controlling brakes on electric or diesel-electric locomotives when used in freight service, passenger service or as switchers and controlling brakes on multiple unit (such as subway) cars each capable of operating as a prime mover for a train of such cars.

According to the invention, there is provided a versatile, relatively inexpensive, easily conditionable brake apparatus of the above type comprising an improved brake valve device embodying a novel equalizing reservoir cut-off valve device and also a brake pipe cut-off valve device; a selector valve device having a freight position to condition the brake valve device to control brakes on a locomotive and on freight cars connected thereto having direct-release type brake controlling valves, a passenger position for conditioning the brake valve device to control brakes on a locomotive and on passenger cars connected thereto having graduated-release type brake controlling valves, and a cut-out position used when the locomotive or a multiple unit car is to be hauled dead in a train, or a brake pipe leakage test is to be made, or the brake valve device on the non-operating end of a double-end (that is, operable from either end) type of prime mover is to be cut out of operation so that brakes may be controlled exclusively from the other or operating end; a simplified independent application and release valve device; and an improved application valve device embodying an application valve which will effect a safety control or train control application of brakes, and a suppressing valve which under a variety of conditions will automatically suppress such an application.

According to different embodiments of the invention, during a safety control or train control application of brakes, a full service reduction in equalizing reservoir pressure will be automatically effected in one stage or in two stages; the latter better serving to more gradually gather slack in the train and thus minimize the possibility of severe run-in of the cars and consequent damage to passengers and/or freight.

Other advantages of the improved brake apparatus will become apparent from the following more detailed description of the invention and from the accompanying drawings, wherein:

Figs. 1A and 1B, when taken together such that the lower edge of Fig. 1A is matched with the upper edge of Fig. 1B, constitute a diagrammatic view of a brake apparatus embodying the invention;

Fig. 2 is a diagrammatic development view showing the port connections and pressure conditions established by a control valve, a vent valve, an emergency valve, and a suppression valve (which are components of a brake valve device shown in Fig. 1A) when the handle of said brake valve device is in various specified positions;

Fig. 3 is a diagrammatic development view showing port connections established in various positions of a selector valve shown in Fig. 1A; and Fig. 4 is a diagrammatic view of a portion of the brake apparatus shown in Figs. 1A and 1B, as modified to embody an alternative form of the invention.

Description—Figs. 1 to 3

As shown in Figs. 1A and 1B, the locomotive fluid pressure brake apparatus embodying the invention comprises an engineer's automatic brake valve device 1 for normally controlling the pressure of fluid in an equalizing reservoir 2 and thereby, by relay action, the pressure of fluid in a brake pipe 3 that extends through the locomotive and connected cars of a train, so as normally to cause fluid pressure brakes on the locomotive and cars to be controlled in unison according to the pressure of fluid provided in the brake pipe; a brake controlling valve device 4 which responds to a reduction in brake pipe pressure to cause an application of locomotive fluid pressure brakes; an independent brake valve device 5 for permitting fluid pressure brakes on the locomotive to be applied and released independently of those on the connected cars; a manually positionable selector valve device 6 for selectively conditioning the apparatus to provide a complete release of brakes for freight service, to provide a graduated release of brakes for passenger service, and to cut out control of brake pipe pressure by the brake valve device 1 for multiple unit or trailing unit operation or for conduct of a brake pipe leakage test; and an application valve device 7 which, under conditions hereinafter to be described, will automatically cause a safety control application or train control application of fluid pressure brakes on the locomotive and cars. The apparatus also comprises an overspeed magnet valve device 8 and/or a safety control (deadman's) valve device 9, and a dynamic brake interlock magnet valve device 10, and preferably comprises a brake cylinder relay valve device 11.

The engineer's automatic brake valve device 1 comprises a sectionalized casing 12 containing a relay valve device 13, a self-lapping control valve device 14, a brake pipe cut-off valve device 15, a vent valve device 16, an emergency valve device 17, a suppression valve device 18 and an equalizing reservoir cut-off valve device 19. Operation of the control valve device 14, vent valve device 16, emergency valve device 17 and suppression valve device 18 are controlled by cams 20, 21, 22, 23, respectively, which are spaced axially along and rotatably connected to a cam shaft 24 that is rotatably supported by the casing and is, in turn, rotatably connected to an arcuately movable brake valve handle 25.

Relay valve device 13 comprises a diaphragm piston 26, which is subject opposingly to fluid pressures in a chamber 27 and a chamber 28 and is adapted through the medium of a coaxially arranged operating stem 29 to effect unseating of a disc-shaped exhaust valve 30 carried by an annular valve member 31 or effect unseating of a disc-shaped supply valve 32 carried by a coaxially arranged annular valve member 33, according to whether pressure in chamber 27 is less than or exceeds the pressure in chamber 28. Stem 29 is coaxially connected to the chamber 28 side of piston 26 and projects centrally through valve member 31 and through a chamber 34 and is adapted to abut one end of supply valve member 33. Helical springs 35, 36 urge the valve members 31, 33 toward each other for normally concurrently seating the valves 30, 32. Exhaust valve 30 controls communication between chamber 34 and a chamber 37 which is open to atmosphere via an exhaust choke 38; whereas supply valve 32 controls communication of chamber 34 with a supply chamber 39 that is always open via a passage 40 and a pipe 41 to a main reservoir 42.

The control valve device 14 comprises a diaphragm piston 43 subject opposingly to pressure of fluid in a chamber 44 and to pressure of a helical regulating spring 45 in an atmospheric chamber 46; the degree of compression of said spring being manually adjustable from outside the casing by means of an adjusting screw 47 that adjusts position of a spring retainer 48 so as to preload the diaphragm piston 43 to a degree corresponding to the desired normal full charge value of equalizing reservoir pressure and hence of brake pipe pressure, as will be understood from subsequent description.

Arranged coaxially with piston 43 is a main cylindrical slide valve 49 that is sealingly slidable in a casing bore open at one end to chamber 44 and at the opposite end to a chamber 50 connected to atmosphere via a vent port 51. An auxiliary slide valve 52 is telescopingly slidable within a coaxially arranged bore through valve 49. A helical spring 53 in chamber 50 biases valve 52 into contact with the chamber 44 side of piston 43; said spring being backed up by a follower member 54 that is positively connected to valve 49 and engages cam 20 so that the position of valve 49 will be controlled according to the rotative position of handle 25.

The brake pipe cut-off valve device 15 comprises an annular cut-off valve 55 that is disposed in a chamber 56 open to brake pipe 3 via a passage 57 and controls communication between chamber 56 and a chamber 58 leading via a passage 59 to chamber 34. Valve 55 is carried by an annular member that is axially shiftable relative to, and retained within a recess open to chamber 58 and formed in one end of a piston 60; said member and hence valve 55 being biased by a spring 61 in said recess into contact with an annular valve seat rib encircling chamber 58. Piston 60 is subject at the opposite end to pressure of a helical bias spring 62 in a normally vented chamber 63. When relay valve device 13 operates to supply fluid under pressure to chamber 34, such pressure fluid acting in chamber 58 will unseat valve 55 and, with a snap-type action, expose the whole of said one end of said piston 60 to such pressure for shifting said piston against resistance of said spring 62 to a position in which said piston, through the medium of a retaining ring, holds valve 55 unseated. Valve 55 will be thus held unseated for permitting free flow of air between chamber 34 and brake pipe 3 unless brake pipe pressure is reduced below 17 p.s.i. or main reservoir air is supplied to chamber 63, under conditions hereinafter to be described. Valve 55 is movable relative to piston 60 to prevent scoring of said valve when chamber 63 is charged with main reservoir air; it being noted that the piston 60 will, under such condition, engage a stop shoulder 64 to take the thrust, so that valve 55 will be biased to its seat merely by the light force of spring 61.

Vent valve device 16 comprises a vent valve 65 normally seated by a helical bias spring 66 for cutting off passage 57 from atmosphere, but unseatable by cam 21 acting through a pusher stem 67 for connecting brake pipe passage 57 to atmosphere via a passage 68 open to atmospheric chamber 50.

Emergency valve device 17 comprises a generally spool-type emergency valve 69 which is biased into operative contact with cam 22 by a helical bias spring 70 and main reservoir pressure in a chamber 71 open to a branch of main reservoir passage 40. Intermediate its ends valve 69 has two axially spaced elongated annular cavities 72, 73, the latter of which is always open via a valve passageway 74 to atmospheric chamber 50.

Suppression valve device 18 comprises a spool-type suppression valve 75 which is biased into operative contact with cam 23 by a helical bias spring 76 and main reservoir pressure in a chamber 77 open to a branch of main reservoir passage 40. Intermediate its ends valve 75 has three axially spaced elongated annular cavities 78, 79, 80 of which cavities 78 and 79 are always connected to atmospheric chamber 50 by way of a valve passageway 81.

Equalizing reservoir cut-off valve device 19 comprises a fluid pressure motor, such as a piston 82, subject oppositely to fluid pressures in a passage 83 and in a passage and pipe 84. This device also comprises a poppet-type cut-off valve 85 subject at its seating side to fluid pressure in passage 84 and at the opposite side to pressure of fluid and of a helical bias spring 86 in a chamber open to a passage 87 leading to the seat of main slide valve 49 of device 14. Thus, valve 85 will permit fluid flow from passage 84 to passage 87 but will prevent flow in the reverse direction unless pressure in passage 83 exceeds that in passage 84 and thereby causes piston 82 to operatively unseat said valve through the medium of a piston rod 88.

The selector valve device 6 preferably comprises a spool-type selector valve 89 that is sealingly slidable in a casing bore and exposed at both ends to atmospheric pressure. Valve 89 has a transversely extending notch into which extends a dog 90 that is eccentrically carried by a rotatable member 91. To shift valve 89 axially to one of its three positions, hereinafter to be defined, a handle 92 is first pushed inwardly against the force of a bias spring 93 to disengage a pin 94 from a position-defining-notch and unlock said handle so that the latter may be rotated and thereby, through engagement of said pin with dog-carrying member 91, operatively move valve 89 to another position in which said pin can be spring-pressed into another position-defining notch.

Intermediate its ends valve 89 has three axially spaced elongated annular cavities 95, 96, 97 and a restricted radial port 98 sealingly separated by O-ring seals. Cavity 95 and port 98 are always connected to atmosphere via a passageway 99 extending through valve 89 and open to atmospheric chamber 50. With selector valve device 6 in a freight position, in which it is shown, cavity 95 connects to atmospheric passageway 99 a passage 100 leading to chamber 63 of device 15; cavity 96 interconnects two legs of a passage 101 that leads to a chamber containing a check valve 102; cavity 97 connects passage 83 with a passage 103 leading to the seat of suppression valve 75; and port 98 is lapped.

The independent brake valve device 5 comprises a self-lapping valve unit including a diaphragm piston 104 subject opposingly to pressure of fluid in a pressure chamber 105 and to pressure of a spring 106 in an atmospheric chamber 107. Arranged coaxially with piston 104 are an exhaust valve 108 and a supply valve 109 that are positively connected to opposite ends of a valve stem 110. Exhaust valve 108 is seatable against an exhaust passage 111 through piston 104 for sealing off chamber 105 from atmospheric chamber 107. Supply valve 109 is contained in a supply chamber 112 open to main reservoir passage 40 and formed within an axially slidable hollow cylindrical seat element 113. Valve 109 is seatable, by a light helical bias spring 114, against a passage through one end of element 113 for sealing off chamber 105 from chamber 112; and a somewhat heavier helical spring 115 contained in chamber 105 and interposed between piston 104 and said one end of element 113 acts to maintain the other end of said element in contact with a cam 116 that is eccentrically carried by a member 117 rotatably disposed in the casing. Rotation of member 117 and thereby of cam 116 is effected by arcuately moving a brake valve handle 118 that is connected by a hinge pin 119 to said member.

A differential area valve piston type independent release valve 120, reciprocable in a direction at right angles to the axis of pin 119, has small and large diameter ends which are exposed to atmospheric pressure and has therebetween an annular chamber 121 which is constantly open to a leg of main reservoir passage 40 leading from chamber 112, so as to present an annular face subject to main reservoir pressure. A helical bias spring 122 acting on the small end of release valve 120 and assisted by main reservoir pressure in chamber 121 acting on said annular face urges said valve to a normal position, in which it is shown. In this position, an actuating passage and pipe 123 is connected to a vent port 124 by an elongated annular cavity 125 in said valve. Handle 118 also carries a roller 126 which, upon depression of said handle by manual force and consequent rocking moment of said handle about pin 119, acts through a pusher stem 127 to shift valve 120 to an independent release position against the pressures of spring 122 and main reservoir fluid in chamber 121. In this position, cavity 125 connects main reservoir passage 40 to actuating passage and pipe 123 for charging the latter.

Thus, independent brake valve device 5 comprises a handle 118 which is movable arcuately from a normal or inoperative position into an application zone for causing cam 116 to condition the self-lapping valve unit (comprising valves 108 and 109 and piston 104) to provide in chamber 105 and thereby in an independent application and release passage and pipe 128 fluid at a pressure proportionate to the extent of movement of said handle into said zone; said handle also being depressible, irrespective of its arcuate position, to cause independent release valve 120 to charge the normally vented actuating passage and pipe 123 with fluid at main reservoir pressure and thus effect an independent release of fluid pressure brakes on the locomotive in the manner hereinafter to be described.

The application valve device 7 comprises a spool-type application valve 129 that is reciprocable in a bore in a sectionalized casing 130 and exposed at one end to fluid pressure in a chamber 131 and at the opposite end is coaxially connected to one side of a diaphragm piston 132. Piston 132 is subject at said one side to pressure of fluid in a valve-encircling chamber 133 that is constantly open via a passage 134 to main reservoir pipe 41; said piston being subject at the opposite side to pressure of fluid and pressure of a heavy helical bias spring 135 in a chamber 136 that is constantly open via a passage 137 and a choke 138 to main reservoir passage 134. Intermediate its ends, valve 129 has three elongated annular cavities 139, 140, 141 which are sealingly isolated from each other by O-ring seals. Spring 135 is of such force as to maintain application valve 129 in a normal position, in which it is shown, so long as pressure in chamber 133 does not exceed the pressure in chamber 136 by more than a preselected degree, such as about 35 p.s.i.

With valve 129 in normal position, cavity 139 connects a pipe 142 to a vent port 143; cavity 140 connects a pipe 144 leading to a reduction limiting reservoir 145 with vent port 143; cavity 141 connects pipe 84 to a pipe and passage 146 which is open to equalizing reservoir 2 and also open via a choke 147 to a passage 148 in brake valve device 1, one branch of which passage 148 leads to the seat of emergency valve 69 and the other branch of which passage leads to chamber 27 of relay valve device 13; branches of passages 134 and 137 are lapped; and a passage 149, that is connected via a choke 150 to pipe 144, is also lapped.

Valve device 7 also preferably comprises a piston 151 subject to pressure of fluid in a chamber 152 open to a pipe 153 acting in opposition to the combined pressure of a helical bias spring 154 in an annular atmospheric chamber 155 and pressure of fluid in a chamber 156 acting on one end of a cylindrical suppressing valve 157 that at its opposite end is coaxially connected to the chamber 155 side of said piston. When chamber 152 is vented, suppressing valve 157 will be biased to a normal or non-suppressing position, in which it is shown, and in which it uncovers chamber 156 and a branch of passage 137 to a safety or train control pipe 158. Branches of pipe 158 lead to the overspeed magnet valve device 8 and safety control device 9 and may, if desired, also lead to other valve devices, such as a conductor's valve device (not shown), which are operative to vent pipe 158 under a variety of control conditions.

Overspeed magnet valve device 8 comprises valve means (not shown) operative to connect a restricted line 159 leading to a whistle 160 selectively with a branch of pipe 158 or a vent port 161 according to whether or not a magnet 162 is deenergized or energized. Magnet 162 is controlled by an electrical circuit comprising a control wire 163 and a return wire 164. This circuit is normally closed for energizing magnet 162 when the train is proceeding at less than a prescribed maximum speed within a restricted speed zone or is proceeding at any speed within unzoned territory; but said circuit is automatically opened by appropriate track circuits in the conventional manner for deenergizing said magnet whenever such prescribed maximum speed is exceeded.

Safety control valve device 9 is preferably of the foot-valve type comprising valve means (not shown) controlled by a pedal 165 that is spring-biased to an elevated position for connecting a branch of pipe 158 to a restricted line 166 leading to a whistle 167; pedal 165 must therefore be maintained depressed against said spring bias in order to prevent venting of pipe 158 via whistle 167.

Brake cylinder relay valve device 11 comprises, briefly, a diaphragm piston 168 subject opposingly to fluid pressures in a chamber 169 and in a chamber 170 that is open via a baffle choke 171 and a pipe 172 to a brake cylinder 173 on the locomotive. Coaxially connected to the chamber 170 side of piston 168 is one end of a cylindrical slide valve 174, the opposite end of which provides an exhaust valve 175 encircling an exhaust passageway 176 formed in said valve and constantly open via suitable radial ports to a vent port 177. When fluid pressure in chamber 169 exceeds that in chamber 170, piston 168 will shift against resistance of a light bias spring 178 in chamber 170 for successively seating exhaust valve 175 against a supply valve 179 and then operatively unseating the latter against the force of a lighter bias spring 180. With supply valve 179 unseated, fluid under pressure will be supplied from a branch of main reservoir pipe 41 to brake cylinder pipe 172 until pressure in chamber 170 has increased to substantially the pressure provided in chamber 169; whereupon piston 168 will be shifted downwardly by spring 178 to a lap position, in which supply valve 179 is reseated by spring 180 and exhaust valve 175 is maintained seated against valve 179, for thereby bottling up fluid in brake cylinder 173 at a pressure substantially equal to that provided in chamber 169. When pressure in chamber 169 is reduced, piston 168 will be biased by spring 178 to a release position, in which it is shown, and in which exhaust valve 175 is unseated from the then seated supply valve 179, for thereby releasing fluid under pressure from brake cylinder 173 until pressure in chamber 170 is reduced to the pressure existing in chamber 169; whereupon piston 168 will be shifted to its previously defined lap position. Thus, relay valve device 11 operates to provide a brake cylinder pressure which is substantially equal to the pressure of fluid provided in chamber 169 by way of a pipe 181.

A double check valve 182 is provided for connecting pipe 181 to independent application and release pipe 128 or to a brake cylinder control pipe 183 leading to brake controlling valve device 4, whichever of these pipes 128 or 183 is charged with fluid at the higher pressure. A branch of pipe 183 leads to a displacement volume 184 which, as known to those skilled in the art, is provided to simulate the displacement effect of the brake cylinder piston in moving to brake-applying position, when a brake cylinder relay valve device is used; and hence if it is preferred to eliminate said relay valve device and to control brake cylinder pressure directly from pipe 181, said volume should also be eliminated.

Brake controlling valve device 4 is preferably of the type fully shown and described in my copending application, Serial No. 693,436, filed October 30, 1957, and assigned to the assignee of the present invention. This valve device comprises, briefly, a service portion 185 comprising reservoir charging control means and a service valve device. This charging control means responds to charging of brake pipe 3 to supply fluid under pressure from the brake pipe to a control reservoir 186 and to a supply reservoir 187. The service valve device responds to charging of brake pipe 3 to connect pipe 183 to a release pipe 188 and responds to a chosen reduction in brake pipe pressure below control reservoir pressure to supply fluid at a corresponding pressure from the supply reservoir 187 to pipe 183; said service valve device thus being operative to provide in pipe 183 fluid at a pressure proportionate to the magnitude of the differential between brake pipe pressure and control reservoir pressure. Valve device 4 also comprises a valve device 189 that responds to charging of a pipe 190 to disconnect the service valve device of portion 185 from pipe 183 and connect the latter to atmosphere, and also supply control reservoir pressure fluid to another valve device 191 for causing the latter to reduce control reservoir pressure to substantially the existing value of brake pipe pressure, for thereby causing the service valve device to effect an independent quick direct release of fluid pressure brakes on the locomotive by connecting pipe 183 to release pipe 188.

A double check valve 192 operates to connect pipe 190 selectively to actuating pipe 123 or to a pipe 193 leading to dynamic brake interlock magnet valve device 10, according to which of these pipes 123 or 193 is charged to the higher pressure.

Dynamic brake interlock magnet valve device 10 comprises valve means (not shown) operative to connect pipe 193 to a vent port 194 or to a branch of main reservoir pipe 41 according to whether a magnet 195 is deenergized or energized. Magnet 195 is controlled by an electrical circuit comprising a control wire 196 and a return wire 197. This circuit is normally open for deenergizing magnet 195, but is automatically closed to energize said magnet whenever dynamic brakes are cut in on the locomotive.

A double check valve 198 operates to connect a pneumatically operated locomotive power cut-off switch 199 selectively to pipe 142 or to a pipe 200 according to which of these pipes is charged to the higher pressure. Branches of pipe 200 lead to a pneumatically operated dynamic brake cut-off switch 201 and to a brake valve passage 202 leading to the seat of emergency valve 69.

A double check valve 203 operates to connect pipe 153 selectively to brake cylinder pipe 172 or to a suppression pipe and passage 204 according to which of these pipes 172 or 204 is charged to the higher pressure.

*Operation—Figs. 1 to 3, with selector valve device 6 in freight position*

Assume initially that the apparatus is devoid of fluid under pressure; that handle 25 of brake valve device 1 is in a release position, and that the force of regulating spring 45 of device 14 has been adjusted to provide a desired (such as 70 p.s.i.) normal charge value of equalizing reservoir pressure; that the independent brake valve handle 118 is elevated and in its normal arcuate position; that the selector valve device 6 is in freight position, for controlling direct release type brakes on freight cars; that the application valve device 7 is in normal position, as shown; and that the magnets 162 and 195 of the magnet valve devices 8 and 10 are deenergized for establishing the connections shown by solid lines 205 and 206, respectively. Under these conditions, the various components of the apparatus will be in the respective positions in which they are shown in Figs. 1A and 1B of the drawings.

*Initial charging*

To initially charge the apparatus, the diesel engines are started for operatively charging the main reservoir 42. Magnet 162 of overspeed magnet valve device 8 is energized from the track circuits to cause the latter to establish a connection 207 whereby train and safety control pipe 158 is disconnected from whistle 160 and hence from atmosphere. Also pedal 165 of safety control valve device 9 must be depressed for cutting off pipe 158 from atmosphere via whistle 167. Pipe 158 must be cut off from atmosphere in the manner just described in order to permit effective charging of the apparatus, for it will be noted that the application valve device 7 connects main reservoir pipe 41 to pipe 158 via choke 138, passage 137 and chamber 156.

With pipe 158 cut off from atmosphere, main reservoir fluid will be effectively supplied from main reservoir pipe 41 to the chamber 136 side of application valve piston 132 at the restricted rate controlled by choke 138, and also be supplied at a substantially unrestricted rate to the chamber 133 side of said piston. However, the selected flow capacity of choke 138 is such that, with chamber 131 then vented to atmosphere via a lockover pipe and passage 208 and cavity 78 of suppression valve 75, pressure in chamber 133 will not exceed the pressure in chamber 136 by an amount sufficient to overcome the heavy (equivalent to 35 p.s.i.) bias of spring 135; and hence the application valve 129 will remain in its previously-described normal position, in which it is shown, during initial charging provided pipe 158 is maintained cut off from atmosphere.

Meanwhile, fluid under pressure will flow via a branch of passage 137, a pipe 209, and at the restricted rate controlled by a choke 210 to a timing volume 211, said choke being provided so as not to delay effective buildup of pressure in chamber 136; however, a check valve 212, arranged in parallel with choke 210, will permit substantially unrestricted flow from volume 211 to pipe 209 in bypass of choke 210, for reasons hereinafter to be described.

Meanwhile, some main reservoir fluid will flow via pipe 41, passage 40, chamber 77 of device 18, passage 103 and cavity 97 of selector valve 89 to passage 83 for causing piston 82 of device 19 to shift and operatively hold the equalizing reservoir cut-off valve 85 unseated; and some of the main reservoir fluid will also flow via passage 40 and a radial supply port 213 in main slide valve 49 and an elongated annular cavity 214 in auxiliary slide valve 52 and a radial delivery port 215 in said valve 49 of device 14, to passage 87, whence it will flow past the unseated cut-off valve 85 to passage and pipe 84 and thence via application valve cavity 141 and pipe 146 to the equalizing reservoir 2 for charging the latter. Charging of equalizing reservoir 2 will continue until equalizing reservoir pressure, as noted via a baffle choke 216 in chamber 44 of device 14, has increased to a value corresponding to the preselected normal charge value of equalizing reservoir pressure; whereupon piston 43 will be deflected leftward and permit spring 53 to correspondingly shift auxiliary slide valve 52 leftward relative to the then stationary main slide valve 49 so as to disconnect cavity 214 from supply port 213 and dispose cavity 214 between but out of registry with ports 213, 215 and thus define a lap position of control valve device 14, in which fluid under pressure is bottled up in equalizing reservoir 2.

Meanwhile, some fluid will flow via equalizing reservoir pipe 146, choke 147 and passage 148 to chamber 27 of relay valve device 13 and cause piston 26 to shift rightward and operatively unseat supply valve 32 for supplying fluid under pressure from main reservoir passage 40 to chamber 34 and thence via passage 59 and a baffle choke 217 to chamber 28, until pressure in chamber 28 has increased to substantially the value of equalizing reservoir pressure provided in chamber 27; whereupon piston 26 will be shifted leftward to a lap position, in which it is shown, and in which supply valve 32 and exhaust valve 30 are concurrently seated, for bottling up fluid under pressure in passage 59 and thus in brake pipe passage 57 and brake pipe 3, it being noted that passage 59 will then be connected to the brake pipe 3 via the brake pipe cut-off valve 55 which will have been unseated against the pressure of spring 61 as soon as pressure of fluid in passage 59 and chamber 58 exceeds 17 p.s.i. Thus, the brake pipe 3 will be charged to a normal charge value which corresponds to the normal charge value of equalizing reservoir pressure as preselected according to the adjusted force of spring 45 of device 14.

Meanwhile, pressure of fluid thus supplied to brake pipe passage 57 and brake pipe 3 will cause brake controlling valve device 4 on the locomotive to operate to charge the control reservoir 186 and supply reservoir 187 to the normal charge value of brake pipe pressure and maintain pipe 183 connected to release pipe 188, in the manner heretofore described. Thus, with pipe 183 vented and independent brake valve handle 118 in its normal arcuate position, in which independent application and release pipe 128 is vented, the pipe 181 will be vented via double check valve 182; and hence brake cylinder relay valve device 11 will be in its release position, in which it is shown, and in which exhaust valve 175 is unseated for connecting brake cylinder 173 to vent port 177.

Meanwhile, the brake controlling valve devices (not shown) on the connected cars of the train will respond to charging of the brake pipe 3 to charge the reservoirs on such cars while maintaining the brake cylinders on such cars vented to atmosphere.

Thus, at the completion of initial charging, all of the components of the brake apparatus will be in the respective positions in which they are shown in Figs. 1A and 1B of the drawings, except that: control valve device 14 will be in its lap position, brake pipe cut-off valve 55 and equalizing reservoir cut-off valve 85 will be held unseated, and magnet 162 of overspeed device 8 will be energized and pedal 165 of safety control valve device 9 will be depressed for preventing release of fluid under pressure from pipe 158.

*Service application of brakes on locomotive and cars*

To effect a service application of brakes, brake valve handle 25 is moved arcuately into an application zone, defined between release position and a service position (see Fig. 2), a degree corresponding to the degree of service application desired, for thereby reducing the thrust of cam 20 and causing spring 53, through the medium of follower 54, to shift main slide valve 49 of control valve device 14 rightward relative to auxiliary slide valve 52, which is then held stationary in contact with piston 43 by spring 53. Under this condition, control valve device 14 will be in a release position, in which auxiliary slide valve cavity 214 connects main slide valve delivery port 215 with an exhaust port 218 formed in the main slide valve and in constant registry with an exhaust passageway 219 leading through the auxiliary slide valve 52 to atmospheric chamber 50. Hence, fluid under pressure will flow from equalizing reservoir 2 through pipe 146 and cavity 141 of application valve 129 to pipe and passage 84, and thence past equalizing reservoir cut-off valve 85 and via passage 87, port 215, cavity 214, port 218 and exhaust passageway 219 to atmosphere (the flow path just traced being hereinafter referred to as the "equalizing reservoir release communication"), until equalizing reservoir pressure, as noted via baffle choke 216 in chamber 44 of device 14, is reduced to a degree sufficient to permit spring 45 to shift piston 43 and thereby auxiliary slide valve 52 rightward relative to the then stationary main slide valve 49 for causing valve device 14 to reassume its previously defined lap position; whereupon fluid will be bottled up in equalizing reservoir 2 at a reduced pressure corresponding to the reduced thrust of cam 20.

Meanwhile, fluid under pressure will be released from chamber 27 of relay valve device 13 via passage 148, service choke 147 and equalizing reservoir pipe 146 at the service rate controlled by said choke. This will cause brake pipe pressure, as noted in chamber 28 of device 13, to shift piston 26 leftward from lap position to a release position in which exhaust valve 30 is operatively unseated. Brake pipe air will thereupon flow via passage 57 and past unseated valve 55 to passage 59 and thence past unseated valve 30 and through release choke 38 to atmosphere at the rate controlled by said choke for reducing brake pipe pressure in chamber 28 to substantially the reduced value of equalizing reservoir pressure in chamber 27; whereupon relay valve piston 26 will be shifted to its lap position for bottling up fluid in the brake pipe at substantially the reduced value of equalizing reservoir pressure.

The brake controlling valve device 4 will respond to this reduction in brake pipe pressure to supply fluid to pipe 183 and displacement volume 184 at a pressure corresponding to the extent of reduction in brake pipe pressure below the pressure of fluid then bottled up in control reservoir 186 at the normal charge value of brake pipe pressure by operation of the aforementioned charging control means of portion 185. Pressure fluid supplied to pipe 183 will flow via double check valve 182 and pipe 181 to relay valve device 11 for causing the latter to operate to provide in brake cylinder 173 fluid at the pressure of fluid provided in pipe 183. Since the brakes on the connected cars are controlled by variations in brake pipe pressure, brakes on both the locomotive and cars will be applied in unison to a degree corresponding to the extent brake pipe pressure has thus been reduced below its normal charge value.

If the brake valve handle 25 is moved to service position, a full service (usually 20 p.s.i.) reduction will be effected in equalizing reservoir pressure and thus in brake pipe pressure for effecting a full service application of brakes on the locomotive and cars.

*Emergency application of brakes on locomotive and cars*

To effect an emergency application of brakes, brake valve handle 25 is moved to an emergency position (see Fig. 2). During this movement, cam 21 will shift pusher stem 67 leftward and thereby unseat vent valve 65; whereupon fluid under pressure will be vented from the brake pipe 3 and brake pipe passage 57 at large capacity past unseated vent valve 65 and via vent passage 68 for reducing brake pipe pressure at an emergency rate.

Meanwhile, during movement of brake valve handle 25 to emergency position, cam 20 will be rotated to its lowest point, causing spring 53 acting through follower 54 to shift main slide valve 49 to a rightmost position relative to the then stationary auxiliary slide valve 52, for causing a complete release of fluid under pressure from the equalizing reservoir via the equalizing reservoir release communication 146, 141, 84, 85, 87, 215, 214, 218, 219.

Meanwhile, movement of brake valve handle 25 to emergency position will cause cam 22 to shift emergency valve 69 leftward to an emergency position (see Fig. 2), in which it will uncover a branch of passage 148 to atmospheric chamber 50 for releasing fluid under pressure from the equalizing reservoir 2 and from relay valve chamber 27 so as thereby to supplement the release flow of equalizing reservoir pressure fluid via the control valve device 14. Also, with emergency valve 69 in emergency position, main reservoir air will be supplied from passage 40 via valve cavity 72 to passage 202 and pipe 200. Some of the pressure fluid supplied to pipe 200 will actuate the pneumatically operated dynamic brake cut-off switch 201 for cutting out the dynamic brakes (if then applied) so as to prevent burning out of the commutators; some of such pressure fluid will flow to an emergency sanding device 220 of conventional type to cause sanding of the rails to increase tractive friction; some of such pressure fluid will flow via double check valve 198 to actuate the power cut-off switch 199 to cut off supply of power from the generator to the motors; and some of such pressure fluid will flow via a check valve 221 to a pipe and passage 222 and thence via a choke 223 to passage 100, one branch of which leads to chamber 63 of device 15 and the other branch of which is open via valve cavity 95 and a very restricted port 224 to atmospheric passageway 99 in selector valve 89. This connection of passage 100 to atmosphere via port 224 is provided to assure that passage 100 and chamber 63 will be vented when the brake valve handle is moved out of emergency position, because check valve 221 will prevent release of pressure fluid from chamber 63 via pipe 200; however, port 224 is of sufficiently small flow capacity to assure that pressure will effectively build up in chamber 63 and assist spring 61 in promptly effecting closure of the brake pipe cut-off valve 55, despite the very restricted flow of main reservoir air to atmosphere via said port. The check valve 221 is necessary when a selector valve, such as 89, is used having a cut-out position, because it would be undesirable to actuate the switches 199 and 201 when main reservoir air is supplied to passage 100 and hence to pipe 222 by said selector valve when moved to cut-out position under conditions hereinafter to be described.

Seating of the brake pipe cut-off valve 55 will cut off relay valve chambers 28 and 34 from the brake pipe 3 and thus positively prevent supply of main reservoir air to the brake pipe passage 57 and brake pipe 3 during an emergency application.

Meanwhile, brake controlling valve device 4 will respond to the emergency rate of reduction in brake pipe pressure to cause fluid, at a pressure higher than obtained upon a full service reduction in brake pipe pressure, to be supplied via pipe 183 and double check valve 182 to pipe 181 for causing relay valve device 11 to provide fluid at a corresponding higher pressure in the brake cylinder 173. The brake controlling valve devices on the cars will likewise operate to cause higher pressures to be provided in the brake cylinders on such cars.

*Release of a service or emergency application of brakes on the locomotive and cars*

Whenever brake valve handle 25 is moved to any position (including those hereinafter to be described) except release position, the suppression valve 75 will be shifted leftward to an intermediate position or to a suppression position (see Fig. 2), in both of which positions it will cut off main reservoir passage 40 from passage 103 and vent the latter. However, with valve 75 in intermediate position (assumed when brake valve handle 25 is in the application zone or service position), suppression pipe 204 and lockover pipe 208 will be connected to atmospheric passageway 81; whereas when handle 25 is in suppression position (assumed when handle 25 is in emergency position or is in a suppression position or in a handle-off position hereinafter to be discussed), pipe 208 will be lapped and pipe 204 will be connected to main reservoir passage 40 via valve cavity 80.

Hence with the brake valve handle 25 in any position except release position and with selector valve 89 in freight position in which it is shown, passage 83 will be vented via selector valve cavity 97 and the then vented passage 103. This will cause piston 82 of device 19 to be moved downward by pressure fluid in passage 84 and thus enable spring 86 to seat the equalizing reservoir cut-off valve 85. Since valve 85 is essentially a check valve, it will be apparent that equalizing reservoir pressure fluid can always flow from pipe 84 to passage 87 and be released via the control valve device 14 during an application of brakes, in the manner already described; but the equalizing reservoir 2 cannot be recharged by flow of pressure fluid from passage 87 to passage 84 unless valve 85 is held unseated by piston 82.

Hence, with this arrangement it is always possible to effect brake applications of a greater degree on top of an existing application; but brake valve handle 25 must be moved to release position, so as to supply main reservoir air to passage 83 and thereby operatively unseat valve 85, in order to permit effective charging of the equalizing reservoir 2 by the control valve device 14 and thus effect a buildup in equalizing reservoir pressure in chamber 27 which will cause relay valve device 13 to recharge the brake pipe 3.

The purpose of the equalizing reservoir cut-off valve device 19 is therefore to assure that this locomotive brake apparatus may safely be used to haul freight cars, which are equipped with direct-release type brake controlling valves, such as the "AB." For if no device 19 were employed and passages 84 and 87 were continuously open to each other, any slight increase in equalizing reservoir pressure (which may be caused, for example, by inadvertently bumping brake valve handle 25 toward release position from service position or within the application zone) will result in the relay valve device 13 effecting a corresponding slight increase in brake pipe pressure which, in turn, will cause a complete direct release of brakes on the freight cars, which of course is undesirable and dangerous.

Hence, to release brakes on the locomotive and cars when the selector valve 89 is in freight position, brake valve handle 25 must be moved to release position; whereupon the brake apparatus on the locomotive and cars will be recharged via communications described in connection with initial charging for completely venting all brake cylinders.

*Operation with selector valve device 6 in passenger position*

With selector valve 89 of device 6 in passenger position (see Figs. 1A, 1B and 3), passage 100 is maintained connected to atmosphere via cavity 95, restricted port 224 and atmospheric passageway 99; but passage 103 is cut off from passage 83 and the latter is connected via valve cavity 97 to a passage 225 leading to a chamber containing a check valve 226. This check valve 226 permits air to flow from main reservoir passage 40 to passage 225 but prevents flow in the reverse direction, and is provided so that when the locomotive is hauled dead in a train and the main reservoir 40 is charged to a pressure about 20 p.s.i. below brake pipe pressure, in accordance with the usual practice, brake pipe pressure fluid will not flow to the main reservoir and charge it above its proper pressure.

Thus, with valve 89 in passenger position, main reservoir air will always be supplied to passage 83 for actuating piston 82 to hold equalizing reservoir cut-off valve 85 unseated, irrespective of and independently of the positioning of brake valve handle 25; it being noted that the changes in pressure in passage 103 effected by the suppression valve 75 responsively to movement of said handle to different positions will now have no effect on the cut-off valve 85 because passage 103 is cut off from passage 83.

Hence, under the above condition, the handle 25 need not be moved all the way back to release position to release fluid pressure brakes on the locomotive and cars in unison. For example, if the handle 25 is in service position and a full service application of brakes is in effect on the locomotive and cars, the engineer may graduate off this application to any desired degree by moving said handle to any desired position in the application zone. The control valve device 14 will thereby be conditioned to provide an increase in pressure in passage 87 and thus, with valve 85 unseated, in pipe 84 which is connected (except during a train control or safety control application) via application cavity 141 and pipe 146 to equalizing reservoir 2; and as equalizing reservoir pressure is thus increased, relay valve device 13 will operate to effect a corresponding increase in brake pipe pressure.

Brake controlling valve device 4 will operate to reduce the degree of brake application on the locomotive to a degree corresponding to the extent of restoration of brake pipe pressure; and the graduated released brake controlling valve devices on the passenger cars (which may be of the "No. 26–C" type disclosed in U.S. application Serial No. 683,661 assigned to the assignee of the present invention) will operate to likewise reduce the degree of brake application on said cars the same degree.

*Operation with selector valve device in freight or passenger position*

*Train control or safety control application of brakes and suppression thereof*

Assume now that, with the brake valve handle 25 in release position, pipe 158 should become vented, such as will occur if the overspeed magnet 162 becomes deenergized in consequence of the train exceeding a prescribed speed within a restricted speed zone or will occur if the engineer removes his foot from pedal 165 of safety control valve device 9. In such event, fluid under pressure will flow at a substantially unrestricted rate from timing volume 211 via check valve 212, pipe 209 and passage 137 to chamber 136 and also to chamber 156, and from chamber 156 via pipe 158 to atmosphere via restricted line 159 and whistle 160 of device 8 or via restricted line 166 and whistle 167 of device 9, as the case may be, and thus give an audible warning signal to the engineer.

The engineer must within a certain time (such as about five seconds from the time the audible warning signal commences, as determined by the selected capacity of volume 211, and restricted flow capacities of lines 159 and 166 and flow capacity of choke 138) demonstrate his alertness by redepressing the pedal 165 (if his foot had been removed therefrom) or manually effecting a brake application (if the overspeed magnet 162 had become deenergized). In the latter event, the brake valve handle 25 must be moved far enough into the application zone to provide in the brake cylinder 173 and hence in pipe 172 fluid at a pressure of at least 25 p.s.i. or moved to service position or emergency position (in which brake cylinder pressure will exceed 25 p.s.i.) or moved to a suppression position (see Fig. 3), for permanently suppressing the safety control or train control application, in the manner now to be explained.

Whenever the brake valve handle 25 is moved to suppression position or to emergency position, the suppression valve 75 will be shifted leftward by cam 23 to its previously defined suppression position in which main reservoir air is supplied from passage 40 via cavity 80 to suppression pipe 204.

Double check valve 203 will supply pressure fluid from the more highly charged of the pipes 172 or 204 to pipe 153 and chamber 152; and if the pressure of fluid in chamber 152 exceeds 25 p.s.i., suppressing valve 157 will be operatively shifted to a suppressing position against resistance of spring 154. In this position, valve 157 cuts off pipe 158 from passage 137, for preventing blowdown of pressure in chamber 136 to atmosphere via pipe 158. Application valve 129 will therefore remain in its normal position, in which it is shown, even if pipe 158 is vented, and hence the engineer may remove his foot from pedal 165.

Meanwhile, if the brake valve handle 25 had been moved into the application zone or to service position or emergency position, the apparatus will operate in the manner previously described to effect an application of brakes on the locomotive and cars. If, however, handle 25 had been moved to suppression position, the control valve device 14 will be conditioned by cam 20 to provide a full service application of brakes on the locomotive and cars with the apparatus arranged as shown in Figs. 1 through 3.

Assuming now that brake valve handle 25 is in release position (or not far enough into the application zone to provide a brake cylinder pressure of at least 25 p.s.i.), suppressing valve 157 will be in its non-suppressing position, as shown. Hence, if the engineer does not make timely response to the audible warning when given by whistle 160 or 167, fluid under pressure in the timing volume 211 and in chamber 136 will blow down via passage 137, chamber 156 and pipe 158 at a faster rate than chamber 136 can be charged through choke 138 from main reservoir pipe 41.

When pressure in chamber 136 reduces more than 35 p.s.i. below main reservoir pressure in chamber 133, piston 132 will move upwardly against the force of spring 135 and shift application valve 129 toward an application position. During the initial phase of this movement, passage 137 will be uncovered to chamber 131 and cause pressure in chamber 136 to equalize into chamber 131 which is then vented to atmosphere via lockover pipe and passage 208, suppression valve cavity 78, a restricted radial port 227 of greater flow capacity than choke 138 and atmospheric passageway 81; and this drop in pressure in chamber 136 and temporary buildup in pressure in chamber 131 behind said restricted radial port due to the volume of chamber 136 will cause application valve 129 to be snapped to its application position (or, if preferred, this restricted port 227 may be opened up, so that pressure in chamber 136 will be promptly vented via chamber 131 and thus snap application valve 129 to application position). With valve 129 in this position, pressure in chamber 136 will blow down via the communication just described (including 137, 131, 208, 81) at a faster rate than pressure in chamber 136 can build up via choke 138 with the result that said chamber will be completely vented for effecting a brake application of the degree called for by the application valve device 7 even if the engineer should belatedly respond to the warning whistle 160 or 167 so as to penalize the engineer for not having made a timely response; main reservoir air will flow via passage 134 and valve cavity 139 to pipe 142 and thence via double check valve 198 to power cut-off switch 199 for cutting off the supply of power to the motors on the locomotive; and fluid under pressure will flow from the equalizing reservoir 2 via pipe 146, application valve cavity 141, passage 149, choke 150 and passage and pipe 144 and equalize into the reduction limiting reservoir 145, which will now be cut off from vent port 143. Thus equalizing reservoir pressure will be reduced at a service rate (as controlled by choke 150) and to a degree (as controlled by the capacity of reservoir 145) sufficient to effect a full service reduction in equalizing reservoir pressure.

It is to be noted that during a safety control or train control application of brakes, the brake valve handle 25 may always be moved to a position, such as into an over-reduction zone (see Fig. 2), calling for a greater than the full service (20 p.s.i.) reduction in equalizing reservoir pressure that is automatically provided during such application. With handle 25 in this zone, the same connections are established by the brake valve device 1 as in service position except that the thrust of cam 20 is less than in service position so that control valve device 14 will operate to connect passage 87 to atmosphere until pressure in passage 87 is reduced to a value less than obtained in service position. Hence, with brake valve handle 25 in the over-reduction zone, equalizing reservoir pressure fluid will flow via pipe 146, application valve cavity 141, passage 149, choke 150, pipe 144 to reservoir 145 and also via a check valve 228, pipe 84, and passage 87 to atmosphere via device 14.

Meanwhile, relay valve device 13 will operate to effect a reduction in brake pipe pressure corresponding to the reduction in equalizing reservoir pressure for causing a brake application at a service rate and of a corresponding degree on the locomotive and also on the cars, in the case of passenger cars having No. 26 graduated-release type brake controlling valve devices, or a full service application on the cars in the case of freight cars provided with direct release type brake controlling valve devices. Brake valve handle 25 may, of course, also be moved to emergency position for causing an emergency application of brakes on the locomotive and (freight or passenger) cars in the manner above described.

If, however, it is desired automatically to effect a heavier than full service application of brakes during a safety control or train control type of brake application without requiring movement of the brake valve handle 25 into the over-reduction zone, this may be accomplished by disconnecting pipe 144 from device 7 so that passage 144 will lead directly to atmosphere, in which case equalizing reservoir pressure will blow down to atmosphere at the service rate controlled by choke 150 for providing a brake cylinder pressure on the locomotive (and also on the cars if equipped with No. 26 type graduated release type—rather than direct release type—brake controlling valve devices) equal to that provided during an emergency application but at a service rate of brake cylinder pressure buildup.

Assume now that a safety control or train control application of brakes has been effected as the result of the failure of the engineer to make timely response to the audible warning. To recapture control of the brakes, the engineer must move brake valve handle 25 either to suppression position or to emergency position for causing a full service or an emergency application of brakes, respectively. When handle 25 is moved to either of these positions, suppression valve 75 will be shifted to its suppression position in which, as previously explained, lockover passage and pipe 208 is lapped, and main reservoir air is supplied from passage 40 to suppression passage and pipe 204 and thence via double check valve 203 to pipe 153 for causing suppressing valve 157 to be shifted to its suppressing position for cutting off pipe 158 from passage 137. Main reservoir air will now flow via pipe 41, choke 138 and passage 137 to chamber 136 for recharging the latter and causing the application valve 129 to be shifted to its normal position, in which it is shown. Then, after depressing pedal 165 of device 9 so as to cut off pipe 158 from whistle 167, the engineer may move brake valve handle 25 to release position for causing brakes on the locomotive and cars to be released in the same manner as above described in connection with release of a service or emergency brake application.

*Independent application and release of locomotive brakes*

To apply brakes on the locomotive independently of those on the connected cars, independent brake valve handle 118 is moved arcuately (but without depressing it) into an application zone an extent corresponding to the degree of independent brake application desired. This movement of handle 118 will correspondingly increase the thrust of cam 116 and thus shift element 113 rightward a corresponding extent against the force of spring 115, for causing exhaust valve 108 to be seated by spring 114 and supply valve 109 to be unseated against the force of spring 114. With valve 109 unseated, fluid under pressure will flow via main reservoir passage 40 and chamber 112 past valve 109 to chamber 105, whence it will flow to independent application and release passage and pipe 128 until pressure in chamber 105 and pipe 128 has increased sufficiently to shift piston 104 rightward sufficiently against the force of spring 106 to enable spring 114 to seat supply valve 109 for thereby bottling up fluid in pipe 128 at a pressure corresponding to the extent of rightward movement of element 113 by cam 116 and hence the position of handle 118 in said zone.

Since double check valve 182 will operate to connect pipe 181 to whichever of the pipes 183 or 128 is charged to the higher pressure, the brake cylinder relay valve device 11 will operate to provide a brake cylinder pressure at the pressure of fluid supplied to pipe 128, provided pipe 128 is charged to a higher pressure than then existing in pipe 183. Thus, when brake pipe pressure has been reduced for causing a brake application on the locomotive and cars in unison, brakes may be independently applied to a greater degree on the locomotive by charging pipe 128 to a pressure higher than that then existing in pipe 183.

If, however, it is desired to effect a complete release of locomotive brakes while maintaining brakes applied on the cars, handle 118 is depressed in its normal position for causing pipe 128 to be maintained vented via unseated exhaust valve 108, as shown, but supplying main reservoir air via passage 40, and cavity 125 of independent release valve 120 to actuating passage and pipe 123 as heretofore described. Pressure fluid thus supplied to pipe 123 will flow via double check valve 192 to pipe 190 for causing the valve devices 189, 191 of device 4 to operate, in the manner heretofore described, to vent pipe 183 for causing a complete release of locomotive brakes.

If, however, it is desired to effect a partial release of locomotive brakes while brakes are applied on the locomotive and cars, then handle 118 should be moved into the application zone an extent corresponding to the degree of brake application desired to be retained on the locomotive and then depressed. Under this condition, pipe 123 and hence pipe 190 will be charged for causing venting of pipe 183 as just described; but independent application and release pipe 128 will be charged. Hence the double check valve 182 will operate to smoothly reduce the pressure in pipe 181 to the pressure of fluid provided in pipe 128 for thus smoothly reducing the pressure in the locomotive brake cylinder 173 to the desired value.

*Dynamic brake application*

Assuming now that dynamic brakes on the locomotive have been cut into operation, dynamic brake interlock magnet 195 will be automatically energized for causing valve device 10 to supply main reservoir air from pipe 41 via a connection 229 to pipe 193. Pressure fluid supplied to pipe 193 will flow via double check valve 192 to pipe 190 for causing an independent complete release of fluid pressure brakes on the locomotive, as above described, so as to prevent overbraking of the locomotive and avoid sliding of the wheels on the locomotive.

*Emergency degree of brake application at a service rate*

To effect an emergency degree of application of brakes on the locomotive and on cars having graduated release type brake controlling valve devices but at a service (rather than emergency) rate, brake valve handle 25 is moved to a handle-off position. With handle 25 in this position (see Fig. 2), cam 20 will be at its lowest point (as in emergency position) for conditioning control valve device 14 to effect a complete release of equalizing reservoir pressure and thus cause relay valve device 13 to effect a complete release of brake pipe pressure; however, the vent valve 65 of device 16 will remain seated, and the emergency valve 69 will remain in its normal position, in which it is shown, for preventing supply of main reservoir air to passage 202 and pipe 200 so that the switches 201 and 199 and emergency sanding device 220 will not be actuated. Thus, brake pipe pressure and equalizing reservoir pressure will be vented at a slow rate, rather than the emergency rate obtained during an emergency brake application, for causing a brake application at a service rate on the locomotive and cars.

Also, with brake valve handle 25 in handle-off position, cam 23 will hold suppression valve 75 in its suppression position in which pipe 204 is charged from main reservoir passage 40 for causing pressure fluid to be supplied via double check valve 203 to pipe 153 for holding suppressing valve 157 of device 7 in its suppressing position so that, as explained in connection with a safety control application of brakes, the engineer need not maintain pedal 165 of device 9 depressed.

It is to be noted that handle-off position is so named because this is the only position in which the brake valve handle 25 can be removed.

Dead engine operation

If the locomotive or a multiple unit (such as subway) car equipped with this apparatus is to be hauled dead in the train, the main reservoir 42 will be charged from the brake pipe 3 via a spring-biased check valve 230 to a pressure somewhat (preferably 20 p.s.i.) less than the normal charge value of brake pipe pressure. Handle 92 of device 6 is operated to shift selector valve 89 to a cut-out position (see Fig. 3), in which passage 83 will be vented via valve port 98 and atmospheric passageway 99, and passage 101 will be connected to passage 100 and to passage 225.

Under this condition, pressure fluid supplied to the brake pipe 3 at the lead locomotive during initial charging will, on the dead locomotive, flow via brake pipe passage 57 and through a choke 231 to the seating side of check valve 102 and unseat said check valve against the force of a helical bias spring and flow past said check valve to passage 101. Some of the pressure fluid supplied to passage 101 will flow via one leg thereof and valve cavity 96 and passage 100 to chamber 63 of device 15 for holding brake pipe cut-off valve 55 seated so that the brake valve device 1 will normally be rendered ineffective to influence brake pipe pressure; and some of such pressure fluid will also flow via the other leg of passage 101 to passage 225 for maintaining check valve 226 seated and preventing main reservoir 42 from being charged to equality with the now more highly charged brake pipe.

Under these conditions, brakes on the dead locomotive will normally be controlled by device 4 in response to variations in brake pipe pressure as effected on the leading (effective) locomotive. If the dead locomotive is unattended, brake valve handle 25 will have been moved to handle-off position and removed; however, if the dead locomotive is attended by an authorized person, said handle may be left on the brake valve device 1. In the latter event, movement of brake valve handle 25 will be of no effect unless said handle is moved to emergency position, in which case the vent valve 65 will be unseated by cam 21 for locally venting the brake pipe 3 at large capacity and thus initiating an emergency application of brakes throughout the train, and emergency valve 69 will be shifted to its emergency position for supplying main reservoir air from passage 40 to pipe 200 to actuate the switches 201 and 199 and sanding device 220.

Brake pipe leakage test

Assume that the train has been made up; that the selector valve 89 of device has been positioned in freight or passenger position according to the make-up of the train; and that the brake apparatus has been initially charged in the manner already described. To make a brake pipe leakage test, as required before the train leaves the make-up point, brake valve handle 25 is moved gradually into the application zone to a position in which equalizing reservoir pressure, as read on a gage (not shown), is reduced 15 p.s.i.

The engineer then leaves handle 25 in the last-mentioned position and waits until brake pipe pressure (which will reduce at a slower rate than equalizing reservoir pressure) has reduced 15 p.s.i.; whereupon he operates handle 92 of device 6 to shift selector valve 89 to its cut-out position. In this position, main reservoir air will flow via passage 40, past check valve 226 to passage 225 and thence via valve cavity 97 to one leg of passage 101 and thence via the other leg of passage 101 and valve cavity 96 to passage 100 and chamber 63 for promptly seating the brake pipe cut-off valve 55 and thus preventing the control valve device 14 from maintaining the brake pipe 3 against leakage. Meanwhile, check valve 102 will prevent main reservoir pressure fluid from flowing from passage 101 into the brake pipe 3.

The engineer then measures the leakage of brake pipe pressure occurring during a one-minute period. If brake pipe leakage exceeds the permissible limit, it is corrected by checking all brake pipe connections for leaks, etc. If and when brake pipe leakage is within the permissible limit, the selector valve 89 is moved back to freight or passenger position, according to the type of cars to be hauled, and brake valve handle 25 is moved to release position for releasing the service application of brakes on the locomotive and cars.

Description and operation—Fig. 4

According to this embodiment of the invention, the locomotive brake apparatus is identical with that shown in Figs. 1 to 3 except in the following respects: pipe 144 leads to a first reduction reservoir 232 (instead of to reduction limiting reservoir 145); pipe 144 leads to a two-position valve device 233 (as well as to check valve 228; device 233 operates to connect a second reduction reservoir 234 selectively to a vent port 235 or to pipe 144 according to whether pressure of fluid in a pipe 236 and a timing volume 237 is less than or exceeds a chosen value, such as about 10 p.s.i.; and a check valve 238 and a choke 239 are disposed in parallel between a branch of pipe 181 and a branch of pipe 236 and so arranged as to permit volume 237 to be charged at a restricted rate via choke 239 but vented at a substantially unrestricted rate via check valve 238.

With this arrangement, whenever the application valve 129 moves to application position for effecting a safety control or train control application of brakes, equalizing reservoir pressure fluid will flow via pipe 146 and valve cavity 141 (see Fig. 1B) to pipe 144 and promptly equalize into the first reduction reservoir 232 which is of such capacity as to provide a reduction of only 8 to 9 p.s.i. in equalizing reservoir pressure and thus, in the manner heretofore described, cause a similar 8 to 9 p.s.i. reduction in brake pipe pressure; whereupon brake controlling valve device 4 will operate promptly to provide fluid at a corresponding pressure in the control pipe 181 leading to relay valve device 11 (or in the brake cylinder 173, if no relay valve device is used). When pressure of fluid thus supplied from pipe 181 via choke 239 in the small timing volume 237 has reached the aforementioned chosen value, valve device 233 will operate to connect pipe 144 to the second reduction reservoir 234; whereupon pressure fluid in the equalizing reservoir 2 and first reduction reservoir 232 will equalize into reservoir 234 for causing a full service reduction in equalizing reservoir pressure and hence in brake pipe pressure.

Thus, during a safety control or train control application, a two-stage or split reduction in equalizing reservoir pressure, and hence in brake pipe pressure, will automatically be effected. During the first stage, a brake cylinder pressure will be provided on the locomotive and cars sufficient to take up slack in the rigging and gently gather slack in the train and apply brakes lightly throughout the train; and during the second stage, brake cylinder pressure on the locomotive and cars will be increased to a degree sufficient to effect a full service application of brakes throughout the train. This arrangement will desirably minimize the possibility of run-in of the cars and consequent severe shock to passengers and/or freight, such as might occur if a full service reduction in brake pipe pressure is made straightaway and without such a split.

It is to be noted that this automatic split reduction in equalizing reservoir pressure will be obtained only during a train control or safety control application of brakes, for under all other conditions the application valve 129 will be in its normal position, as shown, in which reservoir 232 is cut off from the equalizing reservoir 2 and is maintained vented via port 143.

Having now described the invention, what I claim as new and desire to secure by Letters Patent, is:

1. A locomotive fluid pressure brake apparatus comprising an equalizing reservoir in which fluid pressure is reduced for causing an application of brakes and increased for causing a release of brakes; self-lapping control valve means controlling pressure of fluid in a delivery passage; a valve interposed between said passage and reservoir to permit release flow of pressure fluid from said reservoir to said passage and normally prevent charging flow in the reverse direction; pressure responsive means responsive to charging of a chamber to hold said valve open to permit such charging flow; selector valve means for selectively conditioning the locomotive for freight service or passenger service, said selector valve means being operative in a freight position to connect another passage to said chamber and operative in a passenger position to disconnect said other passage from said chamber and supply fluid under pressure to said chamber; other valve means for controlling the pressure of fluid in said other passage; and operator-controlled means movable to a release position for concurrently positioning said other valve means to supply fluid under pressure to said other passage and conditioning said control valve means to charge said equalizing reservoir to a normal charge value of pressure via said delivery passage and valve, said operator controlled means being movable from release position in one direction into an application zone for concurrently conditioning said control valve means to effect a desired reduction in delivery passage pressure and hence in equalizing reservoir pressure via said valve according to the extent of such movement into said zone and movable in the opposite direction within said zone to provide in said delivery passage, and also in said equalizing reservoir provided said valve is then held open, fluid at an increased pressure corresponding to the extent of such opposite movement, said other valve means being positioned by said operator-controlled means while in said zero to vent said other passage, whereby said equalizing reservoir can be recharged only while said operator-controlled means is in release position unless said selector valve means is in passenger position.

2. A locomotive fluid pressure brake apparatus comprising a brake pipe in which fluid pressure is reduced for causing an application of brakes and increased for causing release of brakes, a normally charged equalizing reservoir in which pressure of fluid is varied under control of an operator, relay valve means for providing in one chamber fluid at the pressure of fluid in the equalizing reservoir, brake pipe cut-off valve means controlled by opposing pressures of fluid in said one chamber and in another chamber and responsive to charging of said one chamber while said other chamber is vented to connect said one chamber to the brake pipe and responsive to charging of said other chamber to disconnect said one chamber from the brake pipe, and selector valve means for conditioning the locomotive for different types of service and operative in a freight position and in a passenger position to vent said other chamber and operative in a cut-out position to supply fluid under pressure to said other chamber, whereby with said selector valve means in cut-out position said cut-off valve means will be in its disconnect position and thus render said relay valve means ineffective to control pressure of fluid in the brake pipe.

3. A locomotive fluid pressure brake apparatus comprising a brake pipe in which fluid pressure is reduced for causing an application of brakes and increased for causing release of brakes, an equalizing reservoir, relay valve means for providing in one chamber fluid at the pressure of fluid in the equalizing reservoir, brake pipe cut-off valve means controlled by pressure of fluid in said one chamber acting in opposition to pressure of fluid in another chamber and a bias pressure and opened responsively to charging of said one chamber while the other chamber is vented to connect said one chamber to the brake pipe, and selector valve means for conditioning the locomotive for different types of service and operative in a freight position and in a passenger position to connect said other chamber to atmosphere via a restriction and operative in a cut-out position to supply fluid under pressure to said other chamber to close said cut-off valve means, control valve means for controlling pressure of fluid in the equalizing reservoir, emergency valve means normally ineffective to supply fluid under pressure to said other chamber and operable to an emergency position for supplying fluid under pressure to said other chamber in bypass of the restriction, normally closed vent valve means operable to connect the brake pipe to atmosphere, and operator-controlled means for concurrently controlling operation of said control valve means and emergency valve means and vent valve means, said operator-controlled means being operable to an emergency position for actuating said control valve means to vent said equalizing reservoir and actuating said emergency valve means to its emergency position and opening said vent valve means, whereby said relay valve means will be rendered ineffective to control pressure of fluid in the brake pipe whenever said selector valve means is in cut-out position or said operator-controlled means is in emergency position.

4. In a locomotive fluid pressure brake apparatus of the type comprising a brake valve device having a handle movable to various positions for normally operatively controlling the pressure of fluid in a brake pipe extending through the locomotive and connected cars of a train so as thereby normally to control application and release of brake pipe brakes throughout the train, the combination of normally open brake pipe cut-off valve means responsive to charging of a normally vented chamber to disconnect a branch of the brake pipe from the brake valve device so that the latter will be rendered ineffective to vary brake pipe pressure, a main reservoir normally containing fluid at a pressure higher than brake pipe pressure, a spring-biased check valve for preventing fluid flow from the main reservoir directly to a branch of the brake pipe and permitting flow in the reverse direction so as to charge the main reservoir to a chosen degree less than brake pipe pressure when the locomotive is hauled dead in the train, means defining one one-way flow communication through which fluid under pressure may flow only from the brake pipe to said chamber, means defining another one-way flow communication through which fluid under pressure may flow only from the main reservoir to said chamber, and operator-controlled selector valve means selectively positionable to condition the locomotive for different types of service, said selector valve means being operable to a cut-off position for connecting both of said one-way flow communications to said chamber, whereby fluid under pressure will be supplied to said chamber via the more highly charged of said communications but not be supplied to the brake pipe or main reservoir via the less highly charged of said communications.

5. Apparatus according to claim 4 wherein said one one-way flow communication includes a check valve for permitting flow only from the brake pipe to a certain passage, and said other one-way flow communication includes a check valve for permitting flow only from the main reservoir to a different passage, and wherein said selector valve means is of the spool-valve type comprising two elongated annular cavities which while said selector valve means is in cut-out position respectively connect said different passage to one branch of said certain passage and connect another branch of said certain passage to said chamber.

6. In a vehicle fluid pressure brake apparatus of the type comprising a normally charged brake pipe, a normally charged control pipe, means responsive to a certain control condition to connect the control pipe to a restricted release communication for reducing control pipe pressure at a restricted rate, and application valve means ineffective or effective to cause a reduction in brake pipe pressure according to whether pressure of fluid in a normally charged chamber respectively exceeds or is less than a chosen value, the combination of suppressing valve means operative to connect the chamber to or disconnect the chamber from the control pipe according to whether pressure of fluid in a passage is respectively less than or exceeds a preselected value, a normally vented suppression pipe, a brake cylinder, a pipe charged with fluid at the pressure of fluid in the brake cylinder, double check valve means operative to connect said passage selectively to the last-mentioned pipe or said suppression pipe according to which of these latter two pipes is charged to the higher pressure, and brake valve means including a handle operable to a plurality of positions for controlling pressure of fluid in the brake pipe and operable in at least one of said positions to concurrently charge said suppression pipe with fluid at a pressure exceeding said preselected value and cause a reduction in brake pipe pressure sufficient to provide in the brake cylinder and said last-mentioned pipe fluid at a pressure higher than said preselected value, whereby said suppressing valve means will be operated to prevent reduction in pressure of fluid in said chamber if brake cylinder pressure exceeds said preselected value or said suppression pipe is charged, irrespective of the pressure of fluid existing in the control pipe.

7. Apparatus according to claim 6, wherein said suppressing valve means comprises a differential area piston valve subject at its larger area end to pressure of fluid in said passage and at its smaller area end to pressure of fluid in said chamber and on an annular area intermediate said ends to pressure of fluid and of a bias spring in an atmospheric chamber.

8. A fluid pressure brake apparatus comprising an equalizing reservoir in which fluid pressure is reduced for causing an application of brakes and increased for causing a release of brakes; a lockover pipe, a reduction reservoir; a suppression pipe; a source of fluid under pressure; a choke for charging a chamber at a restricted rate from said source; application valve means controlled by pressure of fluid in said chamber and a bias force acting in opposition to pressure of fluid in said source and pressure of fluid in said lockover pipe, said application valve means being biased by said bias force to a normal position in which said reduction reservoir is vented; brake valve means operable by a handle to a release position for venting said lockover pipe and said suppression pipe, and supplying fluid under pressure to said equalizing reservoir via said application valve means in normal position, and operable by said handle to other positions for causing varying degrees of reduction in pressure in said equalizing reservoir, and operable in at least one of said other positions to charge said suppression pipe from said source and lap said lockover pipe and effect a reduction in equalizing reservoir pressure sufficient to cause a brake application of at least a predetermined degree; a control pipe via which fluid under pressure may be released from said chamber; and suppressing valve means responsive to charging of said suppression pipe to disconnect said control pipe from said chamber and thereby prevent depletion of chamber pressure if and when fluid under pressure should be released from said control pipe; said application valve means being operative, whenever pressure in said chamber is permitted to reduce more than a chosen degree below the pressure in said source, to an application position in which said chamber is connected to said lockover pipe, and said reduction reservoir is disconnected from atmosphere and connected to said equalizing reservoir for automatically causing a reduction in equalizing reservoir pressure and a consequent brake application even if said handle is not moved from its release position.

9. A fluid pressure brake apparatus comprising an equalizing reservoir in which fluid pressure is reduced for causing an application of brakes and increased for causing a release of brakes; a lockover pipe, a source of fluid under pressure; a choke for charging a chamber at a restricted rate from said source; application valve means controlled by pressure of fluid in said chamber and a bias force acting in opposition to pressure of fluid in said source and pressure of fluid in said lockover pipe, said application valve means being biased by said bias force to a normal position; brake valve means operable by a handle to a release position for venting said lockover pipe and supplying fluid under pressure to said equalizing reservoir via said application valve means in normal position, and operable by said handle to other positions for causing varying degrees of reduction in pressure in said equalizing reservoir, and operable in at least one of said other positions to lap said lockover pipe and effect a reduction in equalizing reservoir pressure sufficient to cause a brake application of at least a predetermined degree; said application valve means being movable, whenever pressure in said chamber is permitted to reduce more than a chosen degree below the pressure in said source, to an application position in which said chamber is connected to said lockover pipe and equalizing reservoir pressure is reduced for automatically causing an application of brakes irrespective of the position of said handle, said application valve means during the initial phase of such movement from normal position to application position uncovering said chamber to said lockover pipe for thereby causing a rapid further reduction in chamber pressure so as to assure snap-like continued movement of said application valve means to application position.

10. A fluid pressure brake apparatus comprising an equalizing reservoir in which fluid pressure is reduced for causing an application of brakes and increased for causing a release of brakes; a lockover pipe; another pipe; a reduction reservoir; check valve means permitting fluid flow from said reduction reservoir to said other pipe but preventing flow in the reverse direction; a suppression pipe; a source of fluid under pressure; a choke for charging a chamber at a restricted rate from said source; application valve means controlled by pressure of fluid in said chamber and pressure of a spring bias acting in opposition to pressure of fluid in said source and pressure of fluid in said lockover pipe, said application valve means being biased by said spring bias to a normal position in which said equalizing reservoir is connected to a branch of said other pipe, and said reduction reservoir is vented; brake valve means operable by a handle to a release position for venting said lockover pipe and said suppression pipe, and supplying fluid under pressure to said other pipe for supply via said application valve means in normal position to said equalizing reservoir, and operable by said handle to other positions for causing varying degrees of reduction in pressure in said other pipe and thereby in said equalizing reservoir, and operable in at least one of said other positions to charge said suppression pipe from said source and lap said lockover pipe and effect a reduction in equalizing reservoir pressure sufficient to cause a brake application of at least a predetermined degree; a control pipe via which fluid under pressure may be released from said chamber; suppressing valve means operative responsively to charging of said suppression pipe to a suppressing position for disconnecting said control pipe from said chamber and thereby preventing depletion of chamber pressure if and when fluid under pressure should be released from said control pipe; said application valve means being operative, whenever pressure in said chamber is permitted to reduce more than a chosen degree below the pressure in said source, to an application position in which said chamber is uncovered to said lockover pipe, and said equalizing reservoir is disconnected from said other pipe and connected to said reduction reservoir, and said reduction reservoir is cut off from its vent, whereby upon movement of said application valve means to application position a predetermined reduction in equalizing reservoir pressure will be automatically effected for causing a corresponding application of brakes but such movement of said application valve means and consequently such application of brakes can be prevented by timely operation of said suppressing valve means to suppressing position.

11. Apparatus according to claim 10, wherein said source contains fluid at above a preselected value of pressure, and said suppressing valve means is operative to its suppressing position only upon pressurization of a passage to above said preselected value, and including a brake cylinder, a pipe charged with fluid at the pressure of fluid in the brake cylinder, and double check valve means operative to supply to said passage fluid at the pressure of fluid in the last-mentioned pipe or in said suppression pipe according to which of these latter two pipes is the more highly charged, whereby said suppressing valve means will be actuated to its suppressing position whenever brake cylinder pressure exceeds said preselected value or said suppression pipe is charged.

12. Apparatus according to claim 10, wherein during the initial phase of movement of said application valve means from normal position to application position, said chamber will be uncovered to said lockover pipe and thereby cause a rapid further reduction in pressure of fluid in said chamber of a degree which will effect snap-like continued movement of said application valve means to application position and thus positively prevent hang-up of said application valve means between said positions.

13. Apparatus according to claim 10, wherein said application valve means when in application position establishes a restricted flow connection between said equalizing reservoir and reduction reservoir for causing equalizing reservoir pressure to be reduced at a service rate, and said reduction reservoir is of such capacity that equalization of equalizing reservoir pressure into said reduction reservoir will effect a degree of reduction in equalizing reservoir pressure sufficient to cause a full service application of brakes.

14. Apparatus according to claim 10, including a brake cylinder, a pipe charged with fluid at the pressure of fluid in the brake cylinder, another choke, a timing volume chargeable with fluid under pressure from the last-mentioned pipe at the restricted rate controlled by said other choke, another reduction reservoir, and valve means operative to connect said other reduction reservoir to atmosphere or to the first-mentioned reduction reservoir according to whether pressure in said timing volume is less than or exceeds a preselected value, whereby upon movement of said application valve means to application position a two-stage reduction in equalizing reservoir pressure will be automatically effected for causing a brake application in two stages of successively greater degree according to the respective capacities of said reduction reservoirs.

15. Apparatus according to claim 14, including a check valve arranged in parallel with said other choke for permitting release of timing volume pressure fluid into said last-mentioned pipe at a substantially unrestricted rate in bypass of said other choke and preventing such bypassing flow in the reverse direction, whereby said timing volume will be promptly vented upon venting of said last-mentioned pipe and thereby assure correspondingly prompt venting of said other reduction reservoir in readiness for any brake application which may be effected by movement of said application valve means to application position.

16. In a locomotive fluid pressure brake apparatus for normally controlling brakes on the locomotive and connected cars of a train in unison, an independent brake valve device for applying and releasing brakes on the locomotive independently of those on the cars, said independent brake valve device comprising casing means providing a supply passage, an independent application and release passage and an actuating passage; a self-lapping valve unit comprising a heavy bias spring, a piston reciprocable in said casing means and subject opposingly to pressure of said bias spring and to pressure of fluid in a delivery chamber open to said independent application and release passage, a hollow cylindrical element arranged coaxially with and spaced axially from said piston and sealingly slidable in an aligned bore formed in said casing means, a supply valve contained in a supply chamber formed within said hollow element and constantly open to said supply passage, a light bias spring for normally seating said supply valve to seal off a passageway extending from said supply chamber through one end of said element to said delivery chamber, an exhaust valve positively connected to said supply valve and contained in said delivery chamber and seatable against an exhaust passageway through said piston, and cam means rotatable about an axis substantially perpendicular to the axis of said bore, and another bias spring weaker than said heavy spring and stronger than said light spring disposed in said delivery chamber and bearing against said piston and said one end of said element for biasing the opposite end of said element into operative contact with said cam means; an independent release valve unit comprising release valve means shiftable in a direction parallel to the axis of said cam means and normally resiliently biased to a normal position for venting said actuating passage; and a handle operatively connected to said cam means and to said release valve means; said handle being arcuately movable from a normal position into an application zone to rotate said cam means and progressively increase the thrust of said cam means on said element to condition said self-lapping valve unit to provide in said application and release passage fluid at a pressure corresponding to the extent of arcuate movement of said handle into said zone and operable upon arcuate movement of said handle to normal position to vent said independent application and release passage, said handle when in normal position or in said application zone also being depressible against resistance of the resilient bias to shift said release valve means to an independent release position for charging said actuating passage from said source, said independent application and release passage when charged causing brakes on the locomotive to be applied independently of those on the cars to a degree corresponding to pressure in the latter passage, and said actuating passage when charged causing brakes on the locomotive to be released independently of those on the cars.

17. In a locomotive fluid pressure brake apparatus of the type comprising a reservoir in which fluid pressure is increased for causing a release of brakes and reduced for causing an application of brakes, and control valve means for controlling the pressure of fluid in a delivery communication, the combination of: a cut-off valve interposed between the communication and reservoir to permit release flow of pressure fluid from the reservoir to the communication and normally prevent charging flow in the reverse direction, a fluid pressure motor responsive to charging of a normally vented chamber to operatively hold said cut-off valve open to permit such charging flow, a selector valve operable to a freight position in which said chamber is connected to a passage and operable to a passenger position in which said chamber is disconnected from said passage and charged with pressure fluid in bypass of said passage, other valve means controlling pressure of fluid in said passage, and operator-controlled means concurrently controlling operation of the control valve means and said other valve means, said operator-controlled means being operable to a release position to cause said control valve means to supply fluid at a normal charge value of pressure to the communication and also cause said other valve means to supply pressure fluid to said passage, and operable from release position into an application zone to cause said control valve means to provide in the communication fluid at a selectable lesser pressure corresponding to the extent of movement into said zone and also cause said other valve means to vent said passage, whereby if said operator-controlled means is operated from one position in said zone toward release position to another position in said zone and causes said control valve means to supply fluid at a correspondingly increased pressure in the communication, fluid at such increased pressure will be supplied to the reservoir only if the selector valve is in passenger position in which pressure fluid is supplied to the chamber of said motor in bypass of the then vented passage to operatively hold said cut-off valve open, and if said selector valve is in freight position pressure fluid will be supplied to the reservoir only when said operator-controlled means is in release position in which pressure fluid is supplied by said other valve means to said passage for supply via said selector valve to said chamber to cause said motor to operatively hold said cut-off valve open.

No references cited.